(12) United States Patent
Yang et al.

(10) Patent No.: US 11,824,356 B1
(45) Date of Patent: Nov. 21, 2023

(54) SYSTEM AND METHOD OF BLACK START FOR NEW POWER SYSTEM WITH ENERGY STORAGE CONFIGURATION

(71) Applicant: Xi'an Thermal Power Research Institute Co., Ltd., Xi'an (CN)

(72) Inventors: Peihao Yang, Xi'an (CN); Ganghu Sun, Xi'an (CN); Pengyue Wu, Xi'an (CN); Qi Chai, Xi'an (CN); Shuichao Kou, Xi'an (CN); Xiaohui Wang, Xi'an (CN); Feng Gao, Xi'an (CN); Mengyao Sun, Xi'an (CN); Xinyu Guo, Xi'an (CN); Lei Xue, Xi'an (CN); Lisong Zhang, Xi'an (CN); Ting He, Xi'an (CN); Junbo Zhao, Xi'an (CN); Yunfei Yan, Xi'an (CN); Yulun Chen, Xi'an (CN); Zhipeng Li, Xi'an (CN); Jiewen Wang, Xi'an (CN); HuanHuan Gao, Xi'an (CN); Yue Yin, Xi'an (CN); Benqian Dai, Xi'an (CN); Jinghua Li, Xi'an (CN)

(73) Assignee: Xi'an Thermal Power Research Institute Co., Ltd., Xi'an (CN)

( * ) Notice: Subject to any disclaimer, the term of this patent is extended or adjusted under 35 U.S.C. 154(b) by 0 days.

(21) Appl. No.: 18/338,987

(22) Filed: Jun. 21, 2023

Related U.S. Application Data

(63) Continuation of application No. PCT/CN2022/132034, filed on Nov. 15, 2022.

(30) Foreign Application Priority Data

Jun. 30, 2022 (CN) .......................... 202210759987.X

(51) Int. Cl.
*H02J 3/00* (2006.01)
*H02J 3/38* (2006.01)

(52) U.S. Cl.
CPC .............. *H02J 3/001* (2020.01); *H02J 3/381* (2013.01); *H02J 2300/24* (2020.01); *H02J 2300/28* (2020.01)

(58) Field of Classification Search
CPC ...... H02J 3/001; H02J 3/28; H02J 3/30; H02J 3/32; H02J 3/38; H02J 3/381; H02J 3/388;
(Continued)

(56) References Cited

U.S. PATENT DOCUMENTS 9,667,099 B2 * 5/2017 Schult ...................... H02J 7/34
9,831,678 B2 * 11/2017 Premm ................... H02M 7/44
(Continued)

FOREIGN PATENT DOCUMENTS

CN 104882906 A * 9/2015 ............... H02J 3/38
CN 105846463 A 8/2016
(Continued)

OTHER PUBLICATIONS

Chen et al. "A Synchronization Control Method for Micro-grid with Droop Control", 2015 IEEE Energy Conversion Congress and Exposition (ECCE), Oct. 2015, pp. 519-524. (Year: 2015).*
(Continued)

*Primary Examiner* — M. N. Von Buhr
(74) *Attorney, Agent, or Firm* — Maginot, Moore & Beck LLP

(57) ABSTRACT

A system and a method of black start for a combined operation of wind power, photovoltaic power, energy storage, and thermal power includes a renewable energy alternating current microgrid module, a power transmission and distribution module, and a thermal power generation module, the power transmission and distribution module is coupled to the renewable energy alternating current microgrid module and the thermal power generation module
(Continued)

respectively. The renewable energy alternating current microgrid module includes a photovoltaic unit, a wind power unit, and an energy storage unit. The power transmission and distribution module is configured to transmit the electrical energy generated by the renewable energy alternating current microgrid module to the thermal power generation module. The thermal power generation module is configured to start an auxiliary equipment using the electrical energy transmitted by the power transmission and distribution module.

6 Claims, 3 Drawing Sheets

(58) Field of Classification Search
CPC ........ H02J 3/40; H02J 3/42; H02J 3/44; H02J 3/46; H02J 3/466; H02J 3/48; H02J 2300/24; H02J 2300/28; H02J 5/00; H02J 9/00; H02J 9/04; H02J 9/06; H02J 9/066; H02J 9/08; H02J 11/00
See application file for complete search history.

(56) References Cited

U.S. PATENT DOCUMENTS

| | | | | |
|---|---|---|---|---|
| 10,153,641 | B2* | 12/2018 | Schulz | H02J 3/32 |
| 10,439,433 | B2* | 10/2019 | Golshani | G06Q 50/06 |
| 10,487,746 | B2* | 11/2019 | Hackstein | F01K 13/02 |
| 11,434,871 | B2* | 9/2022 | Abeyasekera | H02J 11/00 |
| 11,462,914 | B2* | 10/2022 | Sørensen | F03D 9/257 |
| 11,646,583 | B2* | 5/2023 | Rosso | H02J 3/24 |
| | | | | 307/84 |
| 2008/0284172 | A1* | 11/2008 | Nielsen | F03D 7/026 |
| | | | | 290/44 |
| 2013/0154262 | A1* | 6/2013 | Tripathi | F03D 7/026 |
| | | | | 290/44 |
| 2016/0233683 | A1* | 8/2016 | Newcomb | H02J 3/40 |
| 2017/0214250 | A1 | 7/2017 | Zietlow et al. | |
| 2022/0209540 | A1* | 6/2022 | Johnson | G05B 19/042 |
| 2022/0364546 | A1* | 11/2022 | Abeyasekera | F03D 7/0284 |

FOREIGN PATENT DOCUMENTS

| | | | | |
|---|---|---|---|---|
| CN | 105978008 | A | * 9/2016 | ................ H02J 3/32 |
| CN | 106329562 | A | * 1/2017 | ................ H02J 3/38 |
| CN | 104716671 | A | * 6/2017 | ................ H02J 3/38 |
| CN | 110994683 | A | 4/2020 | |
| CN | 112234705 | A | * 1/2021 | ................ H02J 9/06 |
| CN | 113852141 | A | 12/2021 | |
| CN | 115189382 | A | 10/2022 | |
| CN | 217882852 | U | 11/2022 | |
| CN | 218415828 | U | 1/2023 | |

OTHER PUBLICATIONS

Machine translation of CN 10471667 A (Jun. 17, 2015) (Year: 2015).*
Machine translation of CN 104882906 A (Sep. 2, 2015) (Year: 2015).*
Hu et al. "A Riding-through Technique for Seamless Transition Between Islanded and Grid-Connected Modes of Droop-Controlled Inverters", Energies, Sep. 2016, 15 pages, vol. 9, No. 9. (Year: 2016).*
Machine translation of CN 105846463 A (Aug. 10, 2016) (Year: 2016).*
Machine translation of CN 105978008 A (Sep. 28, 2016) (Year: 2016).*
Machine translation of CN 106329562 A (Jan. 11, 2017) (Year: 2017).*
Wei et al. Overview of Key Microgrid Technologies, International Transactions on Electrical Energy Systems, Mar. 2018, 22 pages, vol. 28, No. 7. (Year: 2018).*
Zhao et al. "Self-optimizing Droop Control and Quasi-Synchronization Strategy Based on Emergency Power Source", 2019 22nd International Conference on Electrical Machines and Systems (ICEMS), 2019, 4 pages. (Year: 2019).*
Machine translation of CN 110994683 A (Apr. 10, 2020) (Year: 2020).*
Machine translation of CN 113852141 A (Dec. 28, 2021) (Year: 2021).*
Machine translation of CN 112234705 A (Jan. 15, 2021) (Year: 2021).*
Pagnani, Daniela, et al. "Integrating black start capabilities into offshore wind farms by grid-forming batteries." IET Renewable Power Generation (2021). (Year: 2021).*
"Black Start Considerations in a Highly Renewable Supply Future" [machine generated speech transcript] YouTube, uploaded by Naruc, Naruc Center for Partnerships & Innovation Webinar series, Feb. 28, 2022, https://youtu.be/J1E1dWwIK9Q?si=Q2qwzuoFJToPoVDV (Year: 2022).*
Machine translation of CN 115189382 A (Oct. 14, 2022) (Year: 2022).*
Machine translation of CN 217882852 U (Nov. 22, 2022) (Year: 2022).*
Zhao et al., "Energy Storage for Black Start Services: A Review", Internat'l Journal of Minerals, Metallurgy and Materials, Apr. 2022, pp. 691-704, vol. 29, No. 4. (Year: 2022).*
O'Brien, James G., Cassiadoro, Michael, Becejac, Tamara, Sheble, Gerald B., Follum, James D., Agrawal, Urmila, Andersen, Eric S., Touhiduzzaman, Md, and Dagle, Jeffery E.. Electric Grid Blackstart: Trends, Challenges, and Opportunities. United States: N. p., 2022. Web. doi:10.2172/1862969. (Year: 2022).*
Ji et al., "Black Start and Voltage Establishment Strategy for PMSG-Based Wind Turbine," Frontiers in Energy Research, May 11, 2022, Sec. Process and Energy Systems Engineering, vol. 10—2022 | https://doi.org/10.3389/fenrg.2022.901708 (Year: 2022).*
Machine translation of CN 218415828 U (Jan. 31, 2023) (Year: 2023).*

* cited by examiner

SYSTEM AND METHOD OF BLACK START FOR NEW POWER SYSTEM WITH ENERGY STORAGE CONFIGURATION

CROSS-REFERENCE TO RELATED APPLICATION

This application is a continuation application of International Application No. PCT/CN2022/132034, filed on Nov. 15, 2022, which claims priority from Chinese Patent Application Serial No. 202210759987.X, filed on Jun. 30, 2022, the content of which is incorporated herein by reference in its entirety.

FIELD

The present disclosure relates to a field of black start technologies, and more particularly to a system and a method of black start for a combined operation of wind power, photovoltaic power, energy storage, and thermal power.

BACKGROUND

A spatial grid structure of a power system has become increasingly complex as a popularity rate of renewable energy generation increases. It has become an industry consensus to arrange energy storage devices with a certain scale in a renewable energy station. As one of key technologies of energy reform, large-scale energy storage has developed rapidly in recent years due to capable of providing peak regulation, frequency regulation, emergency response and other services for a power grid. As one of auxiliary services for the emergency response in the power grid, "black start" may assist a power failure region in quickly restoring power supply and reduce economic losses. With starting an auxiliary device of a thermal power plant on the opposite side of a transmission line through an energy storage device of the renewable energy station, a thermal power set may resume operation, gradually expanding the recovery scope of the power system, and ultimately achieving recovery of the entire power system.

SUMMARY

Embodiments of a first aspect of the present disclosure provide a system of black start for a combined operation of wind power, photovoltaic power, energy storage, and thermal power. The system includes a renewable energy alternating current microgrid module, a power transmission and distribution module, and a thermal power generation module, the power transmission and distribution module is coupled to the renewable energy alternating current microgrid module and the thermal power generation module respectively;
  the renewable energy alternating current microgrid module includes a photovoltaic unit, a wind power unit, and an energy storage unit, the renewable energy alternating current microgrid module is configured to generate electrical energy;
  the power transmission and distribution module is configured to transmit the electrical energy generated by the renewable energy alternating current microgrid module to the thermal power generation module;
  the thermal power generation module is configured to receive the electrical energy transmitted by the power transmission and distribution module, enabling an auxiliary equipment in the thermal power generation module to start;

the method further includes a first alternating current bus and a second alternating current bus, in which, the power transmission and distribution module is coupled to the renewable energy alternating current microgrid module via the first alternating current bus; and the power transmission and distribution module is coupled to the thermal power generation module via the second alternating current bus;

in which the wind power unit includes a wind turbine set, a wind power AC/DC (alternating current/direct current) rectifier apparatus, a wind power DC/AC (direct current/alternating current) inverter apparatus, a wind power boost transformer, and a wind power grid connection switch;

the wind turbine set, the wind power AC/DC rectifier apparatus, the wind power DC/AC inverter apparatus, and the wind power boost transformer are coupled sequentially; and one end of the wind power grid connection switch is coupled to the first alternating current bus, and the other end of the wind power grid connection switch is coupled to the wind power boost transformer;

in which the energy storage unit includes an energy storage device, an energy storage DC/AC inverter apparatus, and an energy storage boost transformer;

one end of the energy storage boost transformer is coupled to the energy storage device via the energy storage DC/AC inverter apparatus, and the other end of the energy storage boost transformer is coupled to the first alternating current bus;

in which the photovoltaic unit includes a photovoltaic panel, a photovoltaic DC/AC inverter apparatus, a photovoltaic boost transformer, and a photovoltaic grid connection switch;

the photovoltaic panel, the photovoltaic DC/AC inverter apparatus, and the photovoltaic boost transformer are coupled sequentially; and one end of the photovoltaic grid connection switch is coupled to the first alternating current bus, and the other end of the photovoltaic grid connection switch is coupled to the photovoltaic boost transformer;

in which the energy storage unit is configured to provide electrical energy to the photovoltaic unit, and the photovoltaic panel operates in a maximum power final mode to output direct current;

the photovoltaic DC/AC inverter apparatus is configured to convert the direct current power output by the photovoltaic panel into alternating current power; and the photovoltaic boost transformer is configured to boost the alternating current power;

in which, in response to a voltage amplitude and a frequency after boosting reaching a preset voltage amplitude reference value and a frequency reference value of the first alternating current bus, the photovoltaic grid connection switch is turned on to achieve grid connection of the photovoltaic panel;

in which the voltage amplitude reference value and the frequency reference value of the preset first alternating current bus are determined based on droop control through the following equation:

$$\begin{cases} \omega = \omega_0 - mP \\ U = U_0 - nQ \end{cases}$$

where, $\omega$ is an angular frequency of an output voltage of the energy storage DC/AC inverter apparatus; U is an amplitude of the output voltage of the energy storage DC/AC inverter apparatus, which is the voltage amplitude reference value of the first alternating current bus, $\omega_0$ is an angle frequency reference value of a no-load output voltage of the energy storage DC/AC inverter apparatus, which is the frequency reference value of the first alternating current bus, $U_0$ is an amplitude reference value of the no-load output voltage of the energy storage DC/AC inverter apparatus, m is an active power droop coefficient, n is a reactive power droop coefficient, and P is an active power distributed by a load coupled to the energy storage DC/AC inverter apparatus, Q is a reactive power distributed by the load coupled to the energy storage DC/AC inverter apparatus;

in which the power transmission and distribution module includes a power transmission unit;

the power transmission unit includes an alternating current microgrid side transformer, a transmission line, and a thermal power side transformer, the alternating current microgrid side transformer is coupled to the first alternating current bus, and the thermal power side transformer is coupled to the second alternating current bus; and the alternating current microgrid side transformer is coupled to the thermal power side transformer through the transmission line;

in which the thermal power generation module includes: an auxiliary equipment, a thermal power set, a thermal power boost transformer, a start-up standby transformer, a thermal power set grid connection switch, and an auxiliary equipment grid connection switch;

one end of the auxiliary equipment grid connection switch, the start-up standby transformer, the auxiliary equipment, the thermal power set, the thermal power boost transformer, and one end of the thermal power set grid connection switch are coupled sequentially;

the other end of the auxiliary equipment grid connection switch is coupled to the second alternating current bus; and the other end of the thermal power set grid connection switch is coupled to the second alternating current bus;

in which the photovoltaic unit and the wind power unit are started for power generation using the electrical energy provided by the energy storage unit; and the electrical energy generated by the photovoltaic unit and the wind power unit is transmitted to the thermal power generation module through the power transmission and distribution module to complete black start of the thermal power set;

in which transmitting the electrical energy generated by the photovoltaic unit and the wind power unit to the thermal power generation module through the power transmission and distribution module to complete the black start of the thermal power set comprising:

starting the auxiliary equipment using the electrical energy; and driving an operation of the thermal power set by the auxiliary equipment after the auxiliary equipment starts, and completing the black start of the thermal power set;

in which when the thermal power set requires the black start, the electrical energy generated by the renewable energy alternating current microgrid module is transmitted to the thermal power generation module via the power transmission unit, the thermal power generation module turns on the auxiliary equipment grid connection switch, and supplies power to an oil system and a water supply system of the auxiliary equipment of a thermal power plant through the start-up standby transformer; after the auxiliary equipment starts, water vapor drives a steam turbine, and further drives rotation of a rotor of a generator to generate a magnetic field, a stator of the generator cuts magnetic induction lines to generate electrical energy to start the thermal power set, and then the thermal power set connects to the second alternating current bus through the thermal power boost transformer and the thermal power set grid connection switch to achieve grid connection, after the thermal power plant is connected to the grid, a recovery region of the black start is expanded.

Embodiments of a second aspect of the present disclosure provide a method of black start for a combined operation of wind power, photovoltaic power, energy storage, and thermal power. The method includes:

starting the photovoltaic unit and the wind power unit for power generation using electrical energy provided by the energy storage unit; and transmitting the electrical energy generated by the photovoltaic unit and the wind power unit to the thermal power generation module through the power transmission and distribution module to complete black start of a thermal power set;

in which transmitting the electrical energy generated by the photovoltaic unit and the wind power unit to the thermal power generation module through the power transmission and distribution module to complete the black start of the thermal power set includes:

starting the auxiliary equipment using the electrical energy; and driving an operation of the thermal power set by the auxiliary equipment after the auxiliary equipment starts, and completing the black start of the thermal power set.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
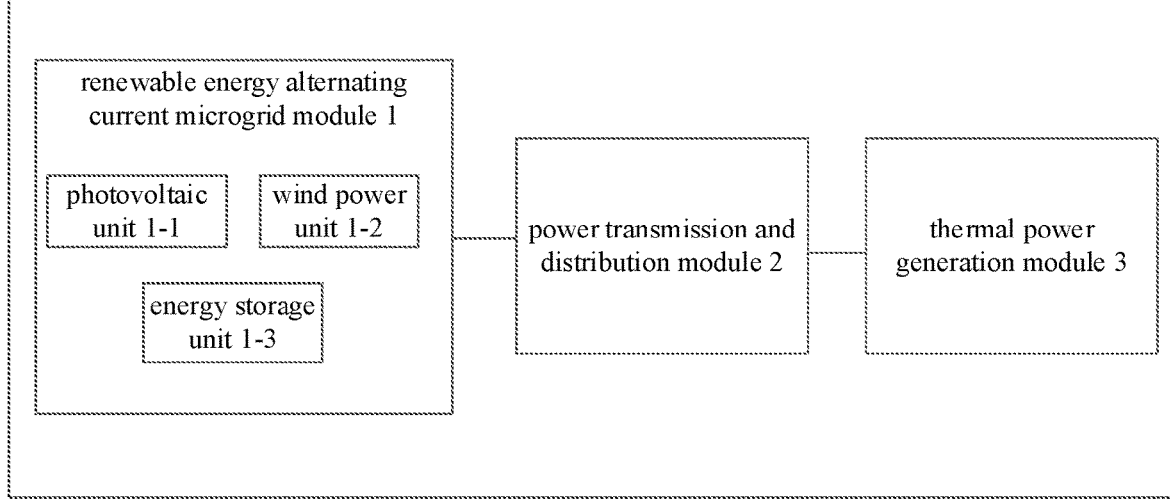
FIG. 1 is a block diagram illustrating a system of black start for a combined operation of wind power, photovoltaic power, energy storage, and thermal power according to an embodiment of the present disclosure.

LIST OF REFERENCE NUMBERS a renewable energy alternating current microgrid module 1; a power transmission and distribution module 2; a thermal power generation module 3; a photovoltaic unit 1-1; a wind power unit 1-2; an energy storage unit 1-3; a first alternating current bus 4; a second alternating current bus 5; a photovoltaic panel 1-1-1; a photovoltaic DC/AC inverter apparatus 1-1-2; a photovoltaic boost transformer 1-1-3; a photovoltaic grid connection switch 1-1-4; a wind turbine set 1-2-1; a wind power AC/DC rectifier apparatus 1-2-2; a wind power DC/AC inverter apparatus 1-2-3; a wind power boost transformer 1-2-4; a wind power grid connection switch 1-2-5; an energy storage device 1-3-1; an energy storage DC/AC inverter apparatus 1-3-2; an energy storage boost transformer 1-3-3; a power transmission unit 2-1; an alternating current microgrid side transformer 2-1-1; a transmission line 2-1-2; a thermal power side transformer 2-1-3; an electricity consuming unit 2-2; a load step-down transformer 2-2-1; a load 2-2-2; an auxiliary equipment 3-1; a thermal power set 3-2; a thermal power boost transformer 3-3; a start-up standby transformer 3-4; a thermal power set grid connection switch 3-5; and an auxiliary equipment grid connection switch 3-6.

DETAILED DESCRIPTION

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are illustrative, used to explain the present disclosure, not construed to limit the present disclosure.

The present disclosure provides a system of black start for a combined operation of wind power, photovoltaic power, energy storage, and thermal power. The system includes a renewable energy alternating current microgrid module, a power transmission and distribution module, and a thermal power generation module. The power transmission and distribution module is coupled to the renewable energy alternating current microgrid module and the thermal power generation module respectively. The renewable energy alternating current microgrid module includes the photovoltaic unit, the wind power unit, and the energy storage unit, the renewable energy alternating current microgrid module is configured to generate electrical energy. The power transmission and distribution module is configured to transmit the electrical energy generated by the renewable energy alternating current microgrid module to the thermal power generation module. The thermal power generation module is configured to receive the electrical energy transmitted by the power transmission and distribution module, enabling an auxiliary equipment in the thermal power generation module to start. Therefore, the present disclosure may realize black start when a generator shuts down due to power failure of the power grid with utilizing the renewable energy alternating current microgrid module, which enriches energy storage functions of the thermal power and solves the technical problem of lacking coordinated participation of wind power, photovoltaic power, thermal power, and energy storage in the existing black start technology.

A system and a method of black start for a combined operation of wind power, photovoltaic power, energy storage, and thermal power according to embodiments of the present disclosure is described with reference to the accompany drawings.

Embodiment One

FIG. 1 is a block diagram illustrating a system of black start for a combined operation of wind power, photovoltaic power, energy storage, and thermal power according to an embodiment of the present disclosure. As illustrated in FIG. 1, the system includes a renewable energy alternating current microgrid module 1, a power transmission and distribution module 2, and a thermal power generation module 3. The power transmission and distribution module 2 is coupled to the renewable energy alternating current microgrid module 1 and the thermal power generation module 3 respectively.

The renewable energy alternating current microgrid module 1 includes a photovoltaic unit 1-1, a wind power unit 1-2, and an energy storage unit 1-3. The renewable energy alternating current microgrid module 1 is configured to generate electrical energy.

The power transmission and distribution module 2 is configured to transmit the electrical energy generated by the renewable energy alternating current microgrid module 1 to the thermal power generation module 3.

The thermal power generation module 3 is configured to receive the electrical energy transmitted by the power transmission and distribution module 2, enabling an auxiliary equipment 3-1 in the thermal power generation module 2 to start.

In an embodiment, the system further includes a first alternating current bus 4 and a second alternating current bus 5.

The power transmission and distribution module 2 is coupled to the renewable energy alternating current microgrid module 1 via the first alternating current bus 4.

The power transmission and distribution module 2 is coupled to the thermal power generation module 3 via the second alternating current bus 5.

Figure 2:
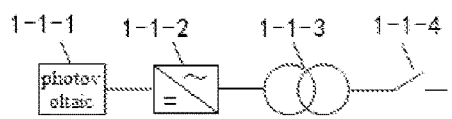
FIG. 2 is a schematic diagram illustrating a structure of a photovoltaic unit according to an embodiment of the present disclosure.

In an embodiment, as illustrated in FIG. 2, the photovoltaic unit 1-1 includes a photovoltaic panel 1-1-1, a photovoltaic DC/AC (direct current/alternating current) inverter apparatus 1-1-2, a photovoltaic boost transformer 1-1-3, and a photovoltaic grid connection switch 1-1-4.

The photovoltaic panel 1-1-1, the photovoltaic DC/AC inverter apparatus 1-1-2, and the photovoltaic boost transformer 1-1-3 are coupled sequentially.

Figure 6:
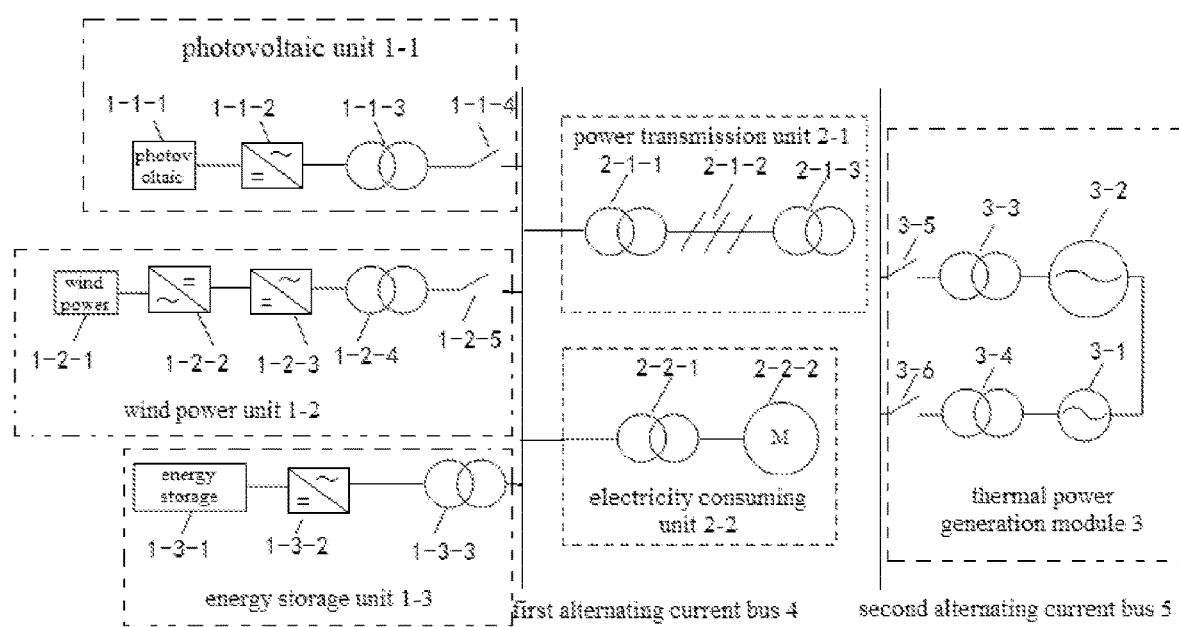
FIG. 6 is a schematic diagram illustrating a structure of a system of black start for a combined operation of wind power, photovoltaic power, energy storage, and thermal power according to an embodiment of the present disclosure.

One end of the photovoltaic grid connection switch 1-1-4 is coupled to the first alternating current bus 4, and the other end of the photovoltaic grid connection switch 1-1-4 is coupled to the photovoltaic boost transformer 1-1-3, as illustrated in FIG. 6.

Figure 3:
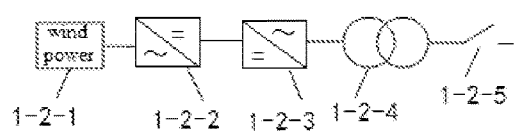
FIG. 3 is a schematic diagram illustrating a structure of a wind power unit according to an embodiment of the present disclosure.

In an embodiment, as illustrated in FIG. 3, the wind power unit 1-2 includes a wind turbine set 1-2-1, a wind power AC/DC rectifier apparatus 1-2-2, a wind power DC/AC inverter apparatus 1-2-3, a wind power boost transformer 1-2-4, and a wind power grid connection switch 1-2-5.

The wind turbine set 1-2-1, the wind power AC/DC rectifier apparatus 1-2-2, the wind power DC/AC inverter apparatus 1-2-3, and the wind power boost transformer 1-2-4 are coupled sequentially. One end of the wind power grid connection switch 1-2-5 is coupled to the first alternating current bus 4, and the other end of the wind power grid connection switch 1-2-5 is coupled to the wind power boost transformer 1-2-4, as illustrated in FIG. 6.

Figure 4:
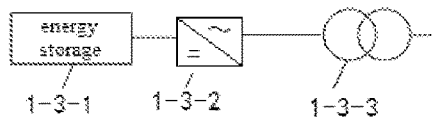
FIG. 4 is a schematic diagram illustrating a structure of an energy storage unit according to an embodiment of the present disclosure.

In an embodiment, as illustrated in FIG. 4, the energy storage unit 1-3 includes an energy storage device 1-3-1, an energy storage DC/AC inverter apparatus 1-3-2, and an energy storage boost transformer 1-3-3.

One end of the energy storage boost transformer 1-3-3 is coupled to the energy storage device 1-3-1 via the energy storage DC/AC inverter apparatus 1-3-2, and the other end of the energy storage boost transformer 1-3-3 is coupled to the first alternating current bus 4, as illustrated in FIG. 6.

In some embodiments, the energy storage unit 1-3 provides electrical energy to the wind power unit 1-2. In response to a wind speed reaching a preset starting wind speed, the wind turbine set 1-2-1 begins to rotate for wind power generation to output alternating current power. Then the wind power AC/DC rectifier apparatus 1-2-2 is configured to filter the alternating current power output by the wind turbine set 1-2-1 to convert the alternating current power into filtered direct current power. Further, the wind power DC/AC inverter apparatus 1-2-3 is configured to convert the filtered direct current power into alternating current power, and then the alternating current power is input into the wind power boost transformer 1-2-4 for boosting. In response to a voltage amplitude and a frequency after boosting reaching a preset voltage amplitude reference value and a frequency reference value of the first alternating current bus 4, the wind power grid connection switch 1-2-5 is turned on to achieve grid connection of the wind turbine set 1-2-1. The preset starting wind speed may be 3 m/s.

The energy storage unit 1-3 is configured to provide electrical energy to the photovoltaic unit 1-1, and the photovoltaic panel 1-1-1 operates in a maximum power final mode to output direct current. The photovoltaic DC/AC inverter apparatus 1-1-2 is configured to convert the direct current power output by the photovoltaic panel 1-1-1 into alternating current power, and then the alternating current power is input into the photovoltaic boost transformer 1-1-3 for boosting. In response to a voltage amplitude and a frequency after boosting reaching a preset voltage amplitude reference value and a frequency reference value of the first alternating current bus 4, the photovoltaic grid connection switch 1-1-4 is turned on to achieve grid connection of the photovoltaic panel 1-1-1.

It is understood that the voltage amplitude reference value and the frequency reference value of the preset first alternating current bus 4 are determined based on a method of droop control. For example, droop control of active-angular frequency and reactive-voltage may be achieved through the following equation:

$$\begin{cases} \omega = \omega_0 - mP \\ U = U_0 - nQ \end{cases}$$

where, $\omega$ is an angular frequency of an output voltage of the energy storage DC/AC inverter apparatus 1-3-2; U is an amplitude of the output voltage of the energy storage DC/AC inverter apparatus 1-3-2, which is the voltage amplitude reference value of the first alternating current bus 4, $\omega_0$ is an angle frequency reference value of a no-load output voltage of the energy storage DC/AC inverter apparatus 1-3-2, which is the frequency reference value of the first alternating current bus 4, $U_0$ is an amplitude reference value of the no-load output voltage of the energy storage DC/AC inverter apparatus 1-3-2, m is an active power droop coefficient, n is a reactive power droop coefficient, and P is an active power distributed by a load coupled to the energy storage DC/AC inverter apparatus 1-3-2, Q is a reactive power distributed by the load coupled to the energy storage DC/AC inverter apparatus 1-3-2.

In an embodiment of the present disclosure, the power transmission and distribution module 2 includes a power transmission unit 2-1.

The power transmission unit 2-1 includes an alternating current microgrid side transformer 2-1-1, a transmission line 2-1-2, and a thermal power side transformer 2-1-3. The alternating current microgrid side transformer 2-1-1 is coupled to the first alternating current bus 4, and the thermal power side transformer 2-1-3 is coupled to the second alternating current bus 5. The alternating current microgrid side transformer 2-1-1 is coupled to the thermal power side transformer 2-1-3 through the transmission line 2-1-2, as illustrated in FIG. 6.

Further, the power transmission and distribution module 2 further includes an electricity consuming unit 2-2.

The electricity consuming unit 2-2 includes a load step-down transformer 2-2-1 and a load 2-2-2. The load 2-2-2 is coupled to the first alternating current bus 4 through the load step-down transformer 2-2-1, as illustrated in FIG. 6. It is understood that, when starting the energy storage device 1-3-1, the load 2-2-2 is required to cut off to ensure that the energy storage device 1-3-1 starts in a no-load state.

Figure 5:
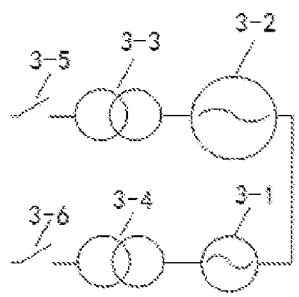
FIG. 5 is a schematic diagram illustrating a structure of a thermal power generation module according to an embodiment of the present disclosure.

In an embodiment of the present disclosure, as illustrated in FIG. 5, the thermal power generation module 3 includes an auxiliary equipment 3-1, a thermal power set 3-2, a thermal power boost transformer 3-3, a start-up standby transformer 3-4, a thermal power set grid connection switch 3-5, and an auxiliary equipment grid connection switch 3-6.

One end of the auxiliary equipment grid connection switch 3-6, the start-up standby transformer 3-4, the auxiliary equipment 3-1, the thermal power set 3-2, the thermal power boost transformer 3-3, and one end of the thermal power set grid connection switch 3-1 are coupled sequentially.

The other end of the auxiliary equipment grid connection switch 3-6 is coupled to the second alternating current bus 5.

The other end of the thermal power set grid connection switch 3-5 is coupled to the second alternating current bus 5.

In some embodiments, when the thermal power set 3-2 requires the black start, the electrical energy generated by the renewable energy alternating current microgrid module 1 is transmitted to the thermal power generation module 3 via the power transmission unit 2-1. The thermal power generation module 3 turns on the auxiliary equipment grid connection switch 3-6, and supplies power to the auxiliary equipment 3-1 of the thermal power plant, such as an oil system and a water supply system, through the start-up standby transformer 3-4. After the auxiliary equipment 3-1 starts, water vapor drives a steam turbine, further driving rotation of a rotor of a generator to generate a magnetic field, a stator cuts magnetic induction lines to generate electrical energy to start the thermal power set 3-2, and then the thermal power set 3-2 connects to the second alternating current bus 5 through the thermal power boost transformer 3-3 and the thermal power set grid connection switch 3-5 to achieve the grid connection. After the thermal power plant is connected to the grid, a recovery region of the black start is expanded.

In summary, the present disclosure provides the system of black start for the combined operation of wind power, photovoltaic power, energy storage, and thermal power. The system includes the renewable energy alternating current microgrid module, the power transmission and distribution module, and the thermal power generation module. The power transmission and distribution module is coupled to the renewable energy alternating current microgrid module and the thermal power generation module respectively. The renewable energy alternating current microgrid module includes the photovoltaic unit, the wind power unit, and the energy storage unit, the renewable energy alternating current microgrid module is configured to generate the electrical energy. The power transmission and distribution module is configured to transmit the electrical energy generated by the renewable energy alternating current microgrid module to the thermal power generation module. The thermal power generation module is configured to receive the electrical energy transmitted by the power transmission and distribution module, enabling the auxiliary equipment in the thermal power generation module to start. Therefore, the present disclosure may realize the black start when a generator shuts down due to power failure of the power grid with utilizing the renewable energy alternating current microgrid module, which enriches energy storage functions of the thermal power and solves the technical problem of lacking the coordinated participation of wind power, photovoltaic power, thermal power, and energy storage in the existing black start technology. At the same time, the voltage amplitude and the frequency of the photovoltaic unit, the wind power unit, and the energy storage unit connected to the first alternating current bus are controlled to be equal to preset values, thereby solving the technical problem of starting system damage caused by unstable starting voltage and frequency in the existing black start technology.

Embodiment Two

Figure 7:
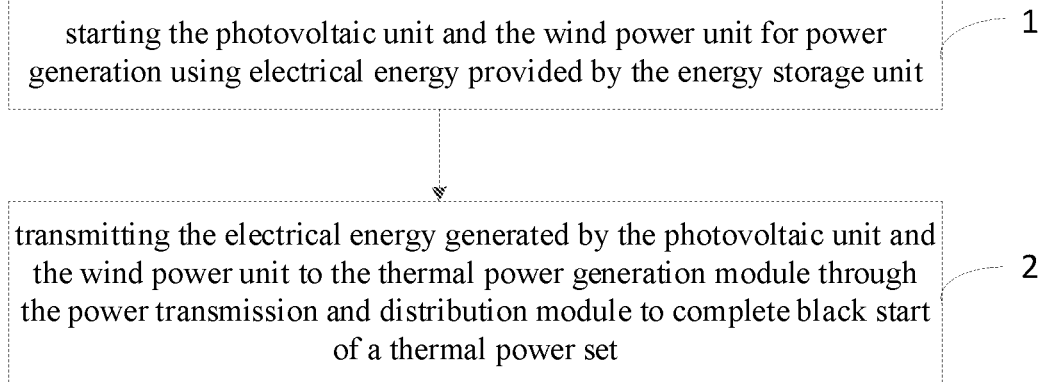
FIG. 7 is a flow chart illustrating a method of black start for a combined operation of wind power, photovoltaic power, energy storage, and thermal power according to an embodiment of the present disclosure.

FIG. 7 is a flow chart illustrating a method of black start for a combined operation of wind power, photovoltaic power, energy storage, and thermal power according to an embodiment of the present disclosure. As illustrated in FIG. 7, the method includes the following blocks.

At block 1, the photovoltaic unit 1-1 and the wind power unit 1-2 are started for power generation using electrical energy provided by the energy storage unit 1-3.

It is understood that the energy storage unit 1-3 is configured to provide electrical energy to the photovoltaic unit 1-1 and the wind power unit 1-2, causing startup of the photovoltaic unit 1-1 and the wind power unit 1-2. The photovoltaic unit 1-1 and the wind power unit 1-2 perform wind power generation and photovoltaic power generation respectively after the photovoltaic unit 1-2 and the wind power unit 1-2 are started.

At block 2, the electrical energy generated by the photovoltaic unit 1-1 and the wind power unit 1-2 is transmitted to the thermal power generation module 3 through the power transmission and distribution module 2 to complete black start of a thermal power set 3-2.

In some embodiments, transmitting the electrical energy generated by the photovoltaic unit 1-1 and the wind power unit 1-2 to the thermal power generation module 3 through the power transmission and distribution module 2 to complete the black start of the thermal power set 3-2 includes:
  starting the auxiliary equipment 3-1 using the electrical energy;
  driving an operation of the thermal power set 3-2 by the auxiliary equipment 3-1 after the auxiliary equipment 3-2 starts, and completing the black start of the thermal power set 3-2.

It is understood that a voltage amplitude and a frequency of the electrical energy generated by the photovoltaic unit 1-1 and the wind power unit 1-2 are equal to a preset voltage amplitude reference value and a frequency reference value of the first alternating current bus 4.

In summary, the method of black start for the combined operation of wind power, photovoltaic power, energy storage, and thermal power provided in the present disclosure may realize the black start when a generator shuts down due to power failure of the power grid with utilizing the renewable energy alternating current microgrid module, which enriches energy storage functions of the thermal power and solves the technical problem of lacking the coordinated participation of wind power, photovoltaic power, thermal power, and energy storage in the existing black start technology. At the same time, the voltage amplitude and the frequency of the photovoltaic unit, the wind power unit, and the energy storage unit connected to the first alternating current bus are controlled to be equal to preset values, thereby solving the technical problem of starting system damage caused by unstable starting voltage and frequency in the existing black start technology.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, schematic representations of the above terms are not necessarily referring to the same embodiment or example. Furthermore, the particular features, structures, materials, or characteristics may be combined in any suitable manner in one or more embodiments or examples. In addition, without contradiction, different embodiments or examples and the features of the different embodiments or examples described in this specification can be combined and assorted by those skilled in the art.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which may not be in the order as shown or discussed, including performing functions in a substantially simultaneous manner or in reverse order based on the related functions, which should be understood by those skilled in the art to which the embodiments of the present disclosure belong.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A system of black start for a combined operation of wind power, photovoltaic power, energy storage, and thermal power, comprising a renewable energy alternating current microgrid module, a power transmission and distribution module, and a thermal power generation module, wherein the power transmission and distribution module is coupled to the renewable energy alternating current microgrid module and the thermal power generation module respectively;

the renewable energy alternating current microgrid module comprises a photovoltaic unit, a wind power unit, and an energy storage unit, the renewable energy alternating current microgrid module is configured to generate electrical energy;

the power transmission and distribution module is configured to transmit the electrical energy generated by the renewable energy alternating current microgrid module to the thermal power generation module; and the thermal power generation module is configured to receive the electrical energy transmitted by the power transmission and distribution module, enabling an auxiliary equipment in the thermal power generation module to start;

the method further comprises a first alternating current bus and a second alternating current bus, wherein, the power transmission and distribution module is coupled to the renewable energy alternating current microgrid module via the first alternating current bus; and the power transmission and distribution module is coupled to the thermal power generation module via the second alternating current bus;

wherein the wind power unit comprises a wind turbine set, a wind power AC/DC (alternating current/direct current) rectifier apparatus, a wind power DC/AC (direct current/alternating current) inverter apparatus, a wind power boost transformer, and a wind power grid connection switch;

the wind turbine set, the wind power AC/DC rectifier apparatus, the wind power DC/AC inverter apparatus, and the wind power boost transformer are coupled sequentially; and one end of the wind power grid connection switch is coupled to the first alternating current bus, and the other end of the wind power grid connection switch is coupled to the wind power boost transformer;

wherein the energy storage unit comprises an energy storage device, an energy storage DC/AC inverter apparatus, and an energy storage boost transformer;

one end of the energy storage boost transformer is coupled to the energy storage device via the energy storage DC/AC inverter apparatus, and the other end of the energy storage boost transformer is coupled to the first alternating current bus;

wherein the photovoltaic unit comprises a photovoltaic panel, a photovoltaic DC/AC inverter apparatus, a photovoltaic boost transformer, and a photovoltaic grid connection switch;

the photovoltaic panel, the photovoltaic DC/AC inverter apparatus, and the photovoltaic boost transformer are coupled sequentially; and one end of the photovoltaic grid connection switch is coupled to the first alternating current bus, and the other end of the photovoltaic grid connection switch is coupled to the photovoltaic boost transformer;

wherein the energy storage unit is configured to provide electrical energy to the photovoltaic unit, and the photovoltaic panel operates in a maximum power final mode to output direct current;

the photovoltaic DC/AC inverter apparatus is configured to convert the direct current power output by the photovoltaic panel into alternating current power; and the photovoltaic boost transformer is configured to boost the alternating current power;

wherein, in response to a voltage amplitude and a frequency after boosting reaching a preset voltage amplitude reference value and a frequency reference value of the first alternating current bus, the photovoltaic grid connection switch is turned on to achieve grid connection of the photovoltaic panel;

wherein the voltage amplitude reference value and the frequency reference value of the preset first alternating current bus are determined based on droop control through the following equation:

$$\begin{cases} \omega = \omega_0 - mP \\ U = U_0 - nQ \end{cases}$$

where, $\omega$ is an angular frequency of an output voltage of the energy storage DC/AC inverter apparatus; U is an amplitude of the output voltage of the energy storage DC/AC inverter apparatus, which is the voltage amplitude reference value of the first alternating current bus, $\omega_0$ is an angle frequency reference value of a no-load output voltage of the energy storage DC/AC inverter apparatus, which is the frequency reference value of the first alternating current bus, $U_0$ is an amplitude reference value of the no-load output voltage of the energy storage DC/AC inverter apparatus, m is an active power droop coefficient, n is a reactive power droop coefficient, and P is an active power distributed by a load coupled to the energy storage DC/AC inverter apparatus, Q is a reactive power distributed by the load coupled to the energy storage DC/AC inverter apparatus;

wherein the power transmission and distribution module comprises a power transmission unit;

the power transmission unit comprises an alternating current microgrid side transformer, a transmission line, and a thermal power side transformer, the alternating current microgrid side transformer is coupled to the first alternating current bus, and the thermal power side transformer is coupled to the second alternating current bus; and the alternating current microgrid side transformer is coupled to the thermal power side transformer through the transmission line;

wherein the thermal power generation module comprises: an auxiliary equipment, a thermal power set, a thermal power boost transformer, a start-up standby transformer, a thermal power set grid connection switch, and an auxiliary equipment grid connection switch;

one end of the auxiliary equipment grid connection switch, the start-up standby transformer, the auxiliary equipment, the thermal power set, the thermal power boost transformer, and one end of the thermal power set grid connection switch are coupled sequentially;

the other end of the auxiliary equipment grid connection switch is coupled to the second alternating current bus; and the other end of the thermal power set grid connection switch is coupled to the second alternating current bus;

wherein the photovoltaic unit and the wind power unit are started for power generation using the electrical energy provided by the energy storage unit; and the electrical energy generated by the photovoltaic unit and the wind power unit is transmitted to the thermal power generation module through the power transmission and distribution module to complete black start of the thermal power set;

wherein transmitting the electrical energy generated by the photovoltaic unit and the wind power unit to the thermal power generation module through the power transmission and distribution module to complete the black start of the thermal power set comprising:

starting the auxiliary equipment using the electrical energy; and driving an operation of the thermal power set by the auxiliary equipment after the auxiliary equipment starts, and completing the black start of the thermal power set;

wherein when the thermal power set requires the black start, the electrical energy generated by the renewable energy alternating current microgrid module is transmitted to the thermal power generation module via the power transmission unit, the thermal power generation module turns on the auxiliary equipment grid connection switch, and supplies power to an oil system and a water supply system of the auxiliary equipment of a thermal power plant through the start-up standby transformer; after the auxiliary equipment starts, water vapor drives a steam turbine, and further drives rotation of a rotor of a generator to generate a magnetic field, a stator of the generator cuts magnetic induction lines to generate electrical energy to start the thermal power set, and then the thermal power set connects to the second alternating current bus through the thermal power boost transformer and the thermal power set grid connection switch to achieve grid connection, after the thermal power plant is connected to the grid, a recovery region of the black start is expanded.

2. The system of claim 1, wherein the energy storage unit is configured to provide electrical energy to the wind power unit, in response to a wind speed reaching a preset starting wind speed, the wind turbine set begins to rotate for wind power generation to output alternating current power;

the wind power AC/DC rectifier apparatus is configured to filter the alternating current power output by the wind turbine set to convert the alternating current power into filtered direct current power;

the wind power DC/AC inverter apparatus is configured to convert the filtered direct current power into alternating current power; and the wind power boost transformer is configured to boost the alternating current power;

wherein, in response to a voltage amplitude and a frequency after boosting reaching a preset voltage amplitude reference value and a frequency reference value of the first alternating current bus, the wind power grid connection switch is turned on to achieve grid connection of the wind turbine set.

3. The system of claim 1, wherein the power transmission and distribution module further comprises an electricity consuming unit;

the electricity consuming unit comprises a load step-down transformer and a load, and the load is coupled to the first alternating current bus through the load step-down transformer.

4. A method of black start for a combined operation of wind power, photovoltaic power, energy storage, and thermal power based on a system of black start for a combined operation of wind power, photovoltaic power, energy storage, and thermal power of claim 1, the method comprising:

starting the photovoltaic unit and the wind power unit for power generation using electrical energy provided by the energy storage unit; and transmitting the electrical energy generated by the photovoltaic unit and the wind power unit to the thermal power generation module through the power transmission and distribution module to complete black start of a thermal power set;

wherein transmitting the electrical energy generated by the photovoltaic unit and the wind power unit to the thermal power generation module through the power transmission and distribution module to complete the black start of the thermal power set comprises:

starting the auxiliary equipment using the electrical energy; and driving an operation of the thermal power set by the auxiliary equipment after the auxiliary equipment starts, and completing the black start of the thermal power set.

5. The method of claim 4, wherein the energy storage unit is configured to provide electrical energy to the photovoltaic unit and the wind power unit causing startup of the photovoltaic unit and the wind power unit, and the photovoltaic unit and the wind power unit perform wind power generation and photovoltaic power generation respectively after the photovoltaic unit and the wind power unit are started.

6. The method of claim 4, wherein a voltage amplitude and a frequency of the electrical energy generated by the photovoltaic unit and the wind power unit are equal to a preset voltage amplitude reference value and a frequency reference value of the first alternating current bus.

* * * * *